United States Patent Office 3,360,511
Patented Dec. 26, 1967

3,360,511
ALOE POLYSACCHARIDE COMPOSITION
AND ITS PREPARATION
Alexander Farkas, 425 NE. 173rd St.,
North Miami Beach, Fla. 33162
No Drawing. Filed Nov. 22, 1966, Ser. No. 596,102
7 Claims. (Cl. 260—209)

ABSTRACT OF THE DISCLOSURE

A method of reducing depolymerization and/or deterioration of aqueous dispersions of aloe polysaccharide compositions by the effect of bacteria, fungi and enzymes, comprising mixing the aloe polysaccharide or its aqueous dispersion with a gum selected from a group consisting of guar gum and locust bean gum, either in dry form or in aqueous dispersions of the gum.

---

The present invention relates to a novel aloe polysaccharide-containing composition in which the normal tendency of the aloe polysaccharide to depolymerize is reduced by the inclusion of guar gum or locust bean gum. The invention also relates to a method for reducing the depolymerization of aloe polysaccharide by mixing the stated gum with the aloe polysaccharide.

Aloe polysaccharide, derived from the juice of the aloe plant, is known to have therapeutic properties particularly in the treatment of wounds of the skin and other body tissue (see, for example, Patent 3,103,466). In my co-pending application Ser. No. 515,469, filed Dec. 21, 1965, is disclosed and claimed a novel polysaccharide derived from the aloe plant which represents a marked improvement over prior materials derived from aloe. These aloe polysaccharides are in the form of long polymer chains, and it has been found that these materials can depolymerize in the presence of water due to the action of airborne fungus and especially under the action of enzymes present in the plant. In my copending application Ser. No. 535,042, filed Mar. 17, 1966, is disclosed and claimed a novel methylated polysaccharide of aloe which possesses improved resistance to depolymerization. Even this material, however, can depolymerize to some extent.

Depolymerization of these aloe polysaccharides manifests itself largely in reduction, on standing, of the viscosity imparted by the polysaccharide to lotions, creams, ointments, and so forth, containing it.

It is the principal object of the present invention to provide a method for reducing depolymerization of aloe polysaccharides.

It is another principal object of the present invention to provide an aloe polysaccharide-containing product possessing improved resistance in depolymerization.

Other objects will become apparent from a consideration of the following specification and claims.

The novel product of the present invention comprises the aloe polysaccharide and a gum selected from the group consistng of guar gum and locust beam gum intimately mixed therewith, and is prepared by mixing the aloe polysaccharide and the gum.

The aloe polysaccharide may be those of the aforementioned patent and patent applications. Essentially it is derived from the juice of the aloe plant by mixing the juice with a water-soluble, lower aliphatic polar solvent, such as methanol, ethanol, isopropanol, acetone, mixtures of two or more of these, and mixtures of one or more of these with diethyl ether. This precipitates the polysaccharide, which is then washed with further solvent. The polysaccharide may be further treated as by methylation, ethylation, sulfation, and the like to introduce functional groups to the molecule.

In any event the aloe polysaccharide is in the form of long polymer chains made up of repeating units, each of which units contains substantially equal amounts of glucose and mannose residues, these combining to make up the preponderant portion of the unit, a small proportion of glucuronic acid residue and chemically bound calcium. When the material is washed with water-soluble, lower-aliphatic polar solvent in anhydrous form, chemically bound water can be removed so that the product is essentially anhydrous. Otherwise, as when the washing solvent is hydrous, that is, contains a small amount of water, the product will be in the form of a hydrate. Analysis of the material shows:

| | Percent by weight |
|---|---|
| Glucose residue | 35–40 |
| Mannose residue | 35–40 |
| Glucuronic acid residue | 1–2 |
| Chemically bound calcium | 13–16 |
| Chemically bound water | 0–9 |

When the product is a hydrate, the chemically bound water will amount to 6–9% by weight.

Because of the relative portions of glucuronic acid residue and calcium, only a small proportion of the calcium is combined with the carboxyl groups of the glucuronic acid portion of the molecule and the remaining is chemically bound to a portion each of the glucose and mannose portions of the molecule. The material will have a molecular weight of at least 100,000 and the molecular weight may go as high as about 620,000 depending, in part, on the method by which it is made and the presence or absence of additional functional groups. Thus, the product of said copending application Ser. No. 515,469 has a very high molecular weight which averages about 450,000 but can vary from about 420,000 to about 520,000. The methylated polysaccharide of copending application Ser. No. 535,042 has a molecular weight of from about 430,000 to about 620,000.

The aloe polysaccharide may be depicted as

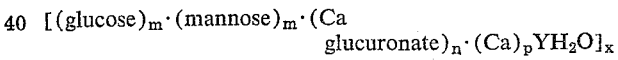

$$[(\text{glucose})_m \cdot (\text{mannose})_m \cdot (\text{Ca glucuronate})_n \cdot (\text{Ca})_p Y H_2 O]_x$$

where $m$ is an integer providing from about 35 to about 40%, by weight, of the unit; $n$ is an integer providing from about 1 to about 2% of the unit, $p$ is an integer which, together with the calcium of the calcium glucuronate portion of the unit, provides from about 13 to about 16% of the unit; $Y$ is an integer providing from essentially 0 to about 9% of the unit, and $x$ is an integer providing a molecular weight from about 100,000 to about 620,000. The aloe polysaccharide preferably used is a hydrate in which Y in the foregoing formula is from about 6 to about 9.

In the foregoing discussion the terms "glucose residue," "mannose residue," "glucose" and "mannose" include such groups containing also additional functional groups. In the case of methylation, for example, it is believed that the methyl groups replace aldehyde hydrogen atoms in the glucose and mannose portions of the molecule.

Referring specifically to the methylated polysaccharide of copending application Ser. No. 535,042, when it is analyzed for added methyl groups and these are taken into account separately, as distinct from being considered as part of the glucose and mannose portions, analysis shows:

| | Percent by weight |
|---|---|
| Glucose residue | 30 to 37 |
| Mannose residue | 30 to 37 |
| Glucuronic acid residue | .9 to 1.7 |
| Chemically bound calcium | 11.5 to 14.2 |
| Chemically bound water | 0 to 8.5 |
| Methyl groups (CH$_3$) | 2 to 20 |

This methylate product may be specifically depicted as:

[(glucose)$_m$·(mannose)$_m$·(Ca glucuronate)$_n$·(Ca)$_p$·(CH$_3$)$_q$·YH$_2$O]$_x$ where $m$ is an integer providing from about 30 to about 37% by weight, of the unit; $n$ is an integer providing from about 0.9 to about 1.7% of the unit; $p$ is an integer which together with the calcium of the calcium glucuronate portion of the unit, provides from about 11.5 to about 14.2% of the unit; $q$ is an integer providing from about 2 to about 20% of the unit; Y is an integer providing 0 to about 8.5% of the unit; and $x$ is an integer providing a molecular weight of from about 430,000 to about 620,000.

Guar gum and locust bean gum (carob bean gum) are well known galactomannan gums of commerce. Either of the individual gums or a mixture thereof may be employed in accordance with the present invention. Guar gum is presently preferred.

In preparing the product of the present invention, the gum and the aloe polysaccharide may simply be mixed together, either in dry form or in water or a water-containing vehicle the nature of which may depend upon the form of the ultimate product; that is, whether it is to be a lotion, ointment, gel, cream, or the like. Separate dispersions in water of the gum and the aloe polysaccharide may be prepared which may then be combined to form a single aqueous dispersion containing the gum and the aloe polysaccharide or these may be combined in a more complex formulation. Concentration of the aloe polysaccharide may range from about 0.1 up to about 10%, by weight, more often from about 1 to about 5%, with preferred compositions containing from about 2 to about 4% of the aloe polysaccharide.

The relative proportions of the gum and the aloe polysaccharide may vary widely, from 5 to about 95% of each based on the combined weight of the gum and aloe polysaccharide. In most cases, however, no more than about 60% of the gum is employed. For cosmetic purposes it is preferred that the gum be present in an amount from about 15 to about 60%, by weight, of the total gum and aloe polysaccharide, and for topical pharmaceutical purposes it is preferred that the gum be present in an amount from about 5 to about 20%.

The invention will be more readily understood from a consideration of the following specific examples which are given for the purpose of illustration only:

*Example 1*

Ten thousand grams of aloe leaf are shredded to give 8000 g. of juice. A 2% aqueous phosphomolybdic acid (2% of H$_3$PO$_4$·12MoO$_3$, by weight) solution in the amount of 0.005 gram of solution, is added to the juice and the mixture is stirred. The precipitate which forms is filtered off, and the filtrate is poured into 32,000 g. of methanol and the mixture is stirred. The resulting blue-green precipitate is filtered off and it, amounting to 50 g., is added to 500 g. of 99% methanol. Aqueous hypochlorous acid, in an amount equivalent to 2.5 g. chlorine, is added, and the precipitate becomes white. The white precipitate is filtered off and is washed by mixing with 300 g. 99% methanol and centrifuging. This washing is repeated three more times. Following the last washing, the white, amorphous, fibrous precipitate is dried under vacuum, at 40–50° C., and ground to a white, amorphous powder through 60 mesh.

The product has a molecular weight of about 450,000 and analyzes as follows:

| | Percent |
|---|---|
| Glucose residue | 37.7 |
| Mannose residue | 37.7 |
| Glucuronic acid residue | 1.8 |
| Calcium (chemically bound) | 14.9 |
| Water (chemically bound) | 7.9 |

Eight grams of this aloe polysaccharide are mixed with 2 grams of guar gum ("Jaguar" of the Stein, Hall & Co.). The mixture is stirred into 400 cc., of distilled water in a blender. One-half gram of a 50:50 mixture of methyl- and propylhydroxybenzoic acid is added as a preservative. The resulting aqueous dispersion in the form of a gel, is usable as such as a cosmetic ointment and may be used as a cosmetic base. The aloe polysaccharide and guar gum can be prepared as a fine, dry mixture by mixing the gel with three volumes of methanol, filtering the precipitate and drying under vacuum. This powder can be re-gelled in water or incorporated in other cosmetic bases.

The foregoing products remain stable over a year showing no significant depolymerization. Similar products without the guar gum lose stability in six to eight weeks.

*Example 2*

Fifty grams of the product of Example 1 of Patent 3,103,466 are blended with 50 grams of locust bean gum in distilled water in an amount to provide a concentration of the aloe polysaccharide of about 3%. One-tenth gram of the preservative used in Example 1 is added. This product is also usable as such as a cosmetic ointment and as a cosmetic base, and exhibits greatly improved resistance to depolymerization.

*Example 3*

Seventy-five grams of the aloe polysaccharide used in Example 1 are mixed with twenty-five grams of guar gum, and 3.2 grams of this mixture are dispersed, in a blender, in 70 cc., of distilled water.

A face cream is prepared from the following:

| | G. |
|---|---|
| Acid stabilized glyceryl monostearate ("Tegacid" of Goldschmidt Chemical Corp.) | 12 |
| Glycerin | 4 |
| Spermaceti | 3 |
| Mineral oil | 5 |
| Lanolin | 2 |

The mixture is heated to its melting point, about 55° C., and is stirred into the above-described guar gum-aloe polysaccharide also heated to 55° C.

*Example 4*

Example 1 is repeated except that, in preparing the aloe polysaccharide, absolute methanol is used instead of 99% methanol to wash the white precipitate to provide an aloe polysaccharide substantially free from chemically combined water.

*Example 5*

Following the procedure of Example 4 but employing 250 cc., of distilled water instead of 70 cc., provides a product in the form of a lotion.

*Example 6*

The aloe polysaccharide prepared as described in Example 1 is dispersed in 25 times its weight of anhydrous methanol. Ethylene glycol is added in an amount equal to 0.5%, by weight, based on the weight of the methanol. Hydrogen chloride gas, to the extent of 0.2%, by weight, based on the weight of the product, is passed into the dispersion which is refluxed for four hours. The insoluble product is filtered off, washed three times with anhydrous methanol and once with diethyl ether, and dried. The resulting product is hydrolyzed in aqueous hydrochloric acid, and quantitative analysis shows 2.8% methylated sugars.

Seventy-five grams of this methylated material are mixed with 25 grams of guar gum. Four grams of this mixture are stirred, in a blender, into 100 cc., of distilled water. The resulting dispersion is usable as such and as a cosmetic base.

Example 7

Example 6 is repeated using, however, locust bean gum in place of the guar gum to provide a dispersion similar to that of Example 6.

Example 8

Eighty grams of the methylated polysaccharide used in Example 6 are mixed with 20 grams of guar gum, and 4.5 grams of this mixture are stirred, in a blender, into 95.5 cc., of distilled water. 8-oxyquinolin sulfate (in the proportion of 1:1500 parts of dispersion) is added to the dispersion as a fungicide preservative.

Modification is possible in formulations containing aloe polysaccharide and gum, as well as in the exact chemical nature of the aloe polysaccharide, without departing from the scope of the invention.

I claim:

1. An aloe polysaccharide-containing composition comprising, in addition to the aloe polysaccharide, a gum selected from the group consisting of guar gum and locust bean gum intimately mixed with said aloe polysaccharide.

2. The product of claim 1 wherein said gum is present in an amount from about 5 to about 95%, by weight, based upon the combined weight of said aloe polysaccharide and said gum.

3. The product of claim 2 wherein said gum is present in an amount from about 5 to about 60%.

4. The product of claim 1 wherein said aloe polysaccharide has the general formula:

$[(glucose)_m \cdot (mannose)_m \cdot (Ca\ glucuronate)_n \cdot (Ca)_p \cdot YH_2O]_x$ where $m$ is an integer providing from about 35 to about 40%, by weight, of the unit; $n$ is an integer providing from about 1 to about 2% of the unit; $p$ is an integer which, together with the calcium of the Ca glucuronate portion of the unit, provides from about 13 to about 16% of the unit; $Y$ is an integer providing from 0 to about 9% of the unit, and $x$ is an integer providing a molecular weight from about 100,000 to about 620,000.

5. The product of claim 4 wherein $x$ is an integer providing a molecular weight of from about 420,000 and about 520,000.

6. The product of claim 1 wherein said aloe polysaccharide has the formula:

$[(glucose)_m \cdot (mannose)_m \cdot (Ca\ glucuronate)_n \cdot (Ca)_p (CH_3)_q \cdot YH_2O]_x$ where $m$ is an integer providing from about 30 to about 37%, by weight, of the unit; $n$ is an integer providing from about 0.9 to about 1.7% of the unit; $p$ is an integer which, together with the calcium of the calcium glucuronate portion of the unit, provides from about 11.5 to about 14.2% of the unit; $q$ is an integer providing from about 2 to about 20% of the unit; $Y$ is an integer providing 0 to about 8.5% of the unit, and $x$ is an integer providing a molecular weight of from about 420,000 to about 620,000.

7. The method of reducing depolymerization and/or deterioration of aqueous-dispersions of aloe polysaccharide compositions by the effect of bacteria, fungi and enzymes, comprising, mixing with said aloe polysaccharide, a gum selected from a group consisting of guar gum and locust bean gum.

References Cited

UNITED STATES PATENTS 3,054,689    9/1962    Jeanes et al. _____ 260—209

LEWIS GOTTS, *Primary Examiner.*

J. R. BROWN, *Assistant Examiner.*